United States Patent
Yang et al.

(10) Patent No.: US 12,289,157 B2
(45) Date of Patent: Apr. 29, 2025

(54) TWO-PHASE ACCESS AUTHENTICATION METHOD INTEGRATING SPATIAL-TEMPORAL FEATURES IN SPACE-AIR-GROUND INTEGRATED NETWORKS

(71) Applicant: ZHEJIANG LAB, Hangzhou (CN)

(72) Inventors: Bin Yang, Hangzhou (CN); Shanyun Liu, Hangzhou (CN); Xiangming Zhu, Hangzhou (CN); Yinan Qi, Hangzhou (CN); Xingming Zhang, Hangzhou (CN); Yongdong Zhu, Hangzhou (CN); Tao Xu, Hangzhou (CN); Peijun Chen, Hangzhou (CN); Kainan Zhu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 398 days.

(21) Appl. No.: 18/085,495

(22) Filed: Dec. 20, 2022

(65) Prior Publication Data

US 2023/0261742 A1    Aug. 17, 2023

Related U.S. Application Data

(63) Continuation of application No. PCT/CN2022/080159, filed on Mar. 10, 2022.

(30) Foreign Application Priority Data

Feb. 15, 2022    (CN) .......................... 202210135193.6

(51) Int. Cl.
   *H04B 7/185*        (2006.01)
   *H04W 12/06*       (2021.01)
(52) U.S. Cl.
   CPC ........ *H04B 7/18593* (2013.01); *H04W 12/06* (2013.01)
(58) Field of Classification Search
   CPC .. H04B 7/18593; H04W 12/06; H04W 12/61; H04W 12/63; H04W 84/06;
   (Continued)

(56) References Cited

U.S. PATENT DOCUMENTS

| | | |
|---|---|---|
| 5,708,716 A | 1/1998 | Tisdale et al. |
| 6,067,442 A | 5/2000 | Wiedeman et al. |

(Continued)

FOREIGN PATENT DOCUMENTS

| | | |
|---|---|---|
| CN | 105827304 A | 8/2016 |
| CN | 110295936 A | 10/2019 |

(Continued)

OTHER PUBLICATIONS

Hwang, M.-S., Yang, C.-C., & Shiu, C.-Y. (2003), An authentication scheme for mobile satellite communication systems. Operating Systems Review, vol. 37 Issue (4), pp. 42-47. https://doi.org/10.1145/958965.958970 (Year: 2003).*

(Continued)

*Primary Examiner* — Brandon J Miller
(74) *Attorney, Agent, or Firm* — IPro, PLLC

(57) ABSTRACT

Disclosed is a two-phase access authentication method integrating spatial-temporal features in space-air-ground integrated networks. In the method, an access authentication is divided into two phases: a primary authentication phase and a continued authentication phase. In the primary authentication phase, a user equipment and a satellite are respectively initialized and registered through a ground network control center. In the authentication phase, a fast and secure access is achieved by using a user ID, facial features, and other authentication factors. In the continued authentication phase, data of a user flow and behavior features are acquired, and feature comparison is performed by using historical user data; and a security level and an authentication decision are output. According to the disclosure, the spatial-temporal features are integrated to perform access authentication on a satellite-ground communication network, the authentication not only achieves a fast access, but also continuously ensures the system security in a service phase.

8 Claims, 2 Drawing Sheets

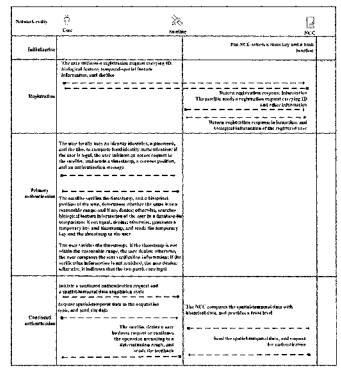

(58) Field of Classification Search
CPC ... H04L 9/3273; H04L 9/0866; H04L 9/3231; H04L 9/3236; H04L 2209/80
See application file for complete search history.

(56) References Cited

U.S. PATENT DOCUMENTS

| | | |
|---|---|---|
| 9,838,870 B2 | 12/2017 | Kanakarajan et al. |
| 2021/0011173 A1* | 1/2021 | Rhee .................. H04B 7/18589 |
| 2021/0281572 A1 | 9/2021 | Fernandez-Spadaro et al. |
| 2021/0357483 A1* | 11/2021 | Sharma .................. G06F 21/32 |
| 2025/0015884 A1* | 1/2025 | Calveras Augé ...... H04B 7/195 |

FOREIGN PATENT DOCUMENTS

| | | | |
|---|---|---|---|
| CN | 110971415 | A | 4/2020 |
| CN | 111314056 | A | 6/2020 |
| CN | 112087750 | A | 12/2020 |
| CN | 113395166 | A | 9/2021 |
| CN | 113783703 | A | 12/2021 |
| FR | 2962226 | A1 | 1/2012 |
| WO | 2007047370 | A2 | 4/2007 |

OTHER PUBLICATIONS

CN 202210135193.6 first office action dated Mar. 28, 2022.

* cited by examiner

A ground network control center is initialized, and selects a main key parameter and a hash function

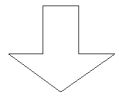

A satellite and a user equipment perform identity registration at the NCC, the user equipment uses its own sensing device to acquire biological and behavior features and other features, and performs feature extraction at the NCC

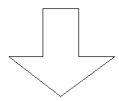

Primary authentication: an access to the satellite, and bidirectional authentication are achieved under the assistance of the NCC on the basis of a spatial-temporal stamp and user position information

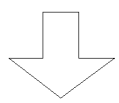

Continued authentication: the satellite initiates a continued authentication request and a spatial-temporal characteristic data acquisition request to the user, the user sends acquired data to the satellite for continued authentication

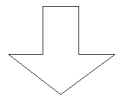

Output a determination result, and end the flow

FIG. 1

| Network entity | User | Satellite | NCC |
|---|---|---|---|
| Initialization | | | The NCC selects a main key and a hash function |
| Registration | The user initiates a registration request carrying ID, biological feature, temporal-spatial feature information, and the like → | ← Return registration response information. The satellite sends a registration request carrying ID and other information → | ← Return registration response information, and biological information of the registered user |
| Primary authentication | The user locally uses an identity identifier, a password, and the like, to complete local identity authentication; if the user is legal, the user initiates an access request to the satellite, and sends a timestamp, a current position, and an authentication message → ← The satellite verifies the timestamp, and a historical position of the user, determines whether the same is in a reasonable range, and if no, denies; otherwise, searches biological feature information of the user in a database for comparison; if not equal, denies; otherwise, generates a temporary key and timestamp, and sends the temporary key and the timestamp to the user. The user verifies the timestamp; if the timestamp is not within the reasonable range, the user denies; otherwise, the user compares the sent verification information; if the verification information is not matched, the user denies; otherwise, it indicates that the two parties are legal | | |
| Continued authentication | Initiate a continued authentication request and a spatial-temporal data acquisition cycle ← Acquire spatial-temporal data in the acquisition cycle, and send the data → ← The satellite denies a user business request or continues the operation according to a determination result, and sends the feedback | → Send the spatial-temporal data, and request for authentication ← | The NCC compares the spatial-temporal data with historical data, and provides a trust level → |

TWO-PHASE ACCESS AUTHENTICATION METHOD INTEGRATING SPATIAL-TEMPORAL FEATURES IN SPACE-AIR-GROUND INTEGRATED NETWORKS

CROSS-REFERENCE TO RELATED APPLICATIONS

This application claims priority to China Patent Application No. 202210135193.6, filed on Feb. 15, 2022 in China National Intellectual Property Administration and entitled "Two-Phase Access Authentication Method Integrating Spatial-Temporal Features in Space-Air-Ground Integrated Networks", which is hereby incorporated by reference in its entirety.

TECHNICAL FIELD

The present disclosure relates to the field of security of communication networks, in particular, to a two-phase access authentication method integrating spatial-temporal features in space-air-ground integrated networks.

BACKGROUND

A space-air-ground integrated network (SAGIN) is a kind of highly heterogeneous network which is composed of a satellite network (including low-orbit satellites, medium-orbit satellites, high-orbit satellites, and satellite links between them), an air network (aircrafts, unmanned aerial vehicles, and other intra-atmospheric aircrafts), and a ground network (base stations and other communication infrastructures) and has an extremely wide coverage range. It can effectively supplement the capabilities of network coverage and business service in harsh environments such as deep mountains, oceans, and deserts, and achieve communication visions of global coverage and ubiquitous services.

Compared with a traditional ground network, SAGINs have shortcomings such as different communication protocol standards, high round-trip transmission delay, highly exposed channels, and limited satellite resources, which bring challenges in providing safe and reliable accesses by users. At the same time, in most traditional access authentication schemes for the SAGIN, satellites are mostly used as transparent forwarding nodes, and the use of a ground network control center authentication scheme will bring greater delay and service instability. In addition, the traditional access authentication schemes are often based only on an authentication scheme for public key infrastructures. However, once key information is intercepted, information may be easily decrypted. Therefore, in view of the shortcomings of the traditional access authentication mechanism, it is needed to design a two-phase access authentication method for a SAGIN, in which an authentication entity moves forward to a satellite, a ground network control center assists in participation, and spatial-temporal features are integrated.

SUMMARY

The purpose of the present disclosure is to provide a two-phase access authentication method integrating spatial-temporal features in SAGINs, so as to overcome the shortcomings in the prior art.

In order to achieve the above purpose, the disclosure provides the following technical solution.

This present application discloses a two-phase access authentication method integrating spatial-temporal features in SAGINs, including the following steps:

S1, an initializing phase: selecting, by a ground network control center, a main key parameter, and selecting a matching hash function simultaneously;

S2, a device registration phase: performing identity information registration and spatial-temporal feature data acquisition in the ground network control center by a satellite having a legal permission and a user equipment respectively;

S3, a primary authentication phase: completing, by a user, local identity authentication, and achieving bidirectional authentication between the user equipment and the satellite under the assistance of the ground network control center;

S4, a continued authentication phase: initiating, by the satellite, a continued authentication request and a spatial-temporal feature data acquisition request to the user equipment (UE); sending, by the UE, acquired data to a satellite; and performing, by the satellite, continued authentication on the user equipment under the assistance of the ground network control center to output a final authentication decision.

As a preferable embodiment, the step S2 specifically includes the following substeps:

S21, registration of the satellite: after receiving a registration request sent by the satellite through a secure channel, selecting, by the ground network control center, an identity identifier for the satellite, calculating, on the basis of the main key parameter, a key of the satellite, and using a hash function-based security protocol to complete the registration of the satellite in the ground network control center;

S22, the user equipment registration: acquiring, by the user equipment, biological feature information of the user, extracting a user face key, splicing the user face key with the identity identifier and a high entropy password, and using the hash function-based security protocol to complete the registration of the user equipment in the ground network control center;

S23, spatial-temporal feature data acquisition: acquiring, by the user equipment, behavior feature data of the user, and transmitting the behavior feature data to the ground network control center through the secure channel; after preprocessing the behavior feature data, performing, by the ground network control center, model training to obtain model parameters; and storing the model parameters to the ground network control center.

As a preferable embodiment, in the step S22, a probabilistic key generation algorithm is used to extract the user face key by a fuzzy extractor.

As a preferable embodiment, in the step S23, the behavior feature data includes a traffic type, a traffic flow, a geographical position, and a Steering angle, and the preprocessing includes clipping and rotation.

As a preferable embodiment, the step S22 further includes the following operations: uploading the biological feature information of a successfully registered user equipment to the satellite after the biological feature information is calculated via a hash function.

As a preferable embodiment, the step S3 specifically includes the following substeps:

S31, inputting, by the user, the identity identifier, a password, and facial feature information to the user equipment; locally using a deterministic key reconstruction algorithm to calculate a biometric key, and verifying whether the identity of the user is legal; if the identity is illegal, terminating the access; if the identity is legal, generating, by the user equipment, a current timestamp, acquiring a current position of the user, calculating an authentication message, and sending the timestamp, the current position of the user, and the authentication message to the satellite through the secure channel;

S32, receiving, by the satellite, the timestamp, the current position of the user, and the authentication message which are sent by the user equipment, and verifying whether an absolute value of a difference value between current time of the satellite and the timestamp is within a range of a time threshold;

if no, denying the user access; otherwise, acquiring, by the satellite, identifier information in the authentication message, and searching, according to the identifier information, a local database of the satellite;

if a successful matching is achieved, acquiring a position of the user equipment at the end of the latest access through the identifier information, and verifying, in combination with the current position of the user, whether an absolute value of a displacement difference value is within a displacement threshold range;

if no, denying the user access; otherwise, searching, according to the identifier information, a hash value of the biological feature information stored in the local database of the satellite, and comparing the hash value with a hash value sent by the user equipment; if the two hash values are not equal, indicating that the user equipment is illegal, denying an access request of the user equipment, and returning authentication failure response information to the user equipment; if the two hash values are equal, generating a temporary session key and a temporary session key timestamp, calculating the temporary session key using the hash function to obtain a new authentication message, and sending the new authentication message and the temporary session key timestamp to the user equipment;

S33, after receiving the new authentication message and the temporary session key timestamp, first checking, by the user equipment, whether an absolute value of a difference value between current time of the user equipment and the temporary session key timestamp is within the range of the time threshold; if no, terminating the access; otherwise, calculating a sharing key between the user equipment and the satellite, and comparing the sharing key with the new authentication message sent by the satellite; if the sharing key does not match the new authentication message, terminating the access; otherwise, completing the authentication, and indicating that the identity of the user is legal and an access may be allowed to a network of the satellite for services.

As a preferable embodiment, the time threshold is 50 ms.

As a preferable embodiment, the step S4 specifically includes the following substeps:

S41, initiating, by the satellite, a continued authentication request and spatial-temporal data acquisition cycle to the user equipment;

S42, after receiving the continued authentication request, sending, by the user equipment, the spatial-temporal feature data to the satellite in the spatial-temporal data acquisition cycle, and sending, by the satellite, the spatial-temporal feature data to the ground network control center;

S43, after receiving the real-time spatial-temporal feature data of the user equipment, comparing, by the ground network control center, the real-time spatial-temporal feature data with historical spatial-temporal feature data, thus providing a security trust level of the user equipment during data transmission, and feeding back the same to the satellite; and continuing or terminating, by the satellite according to security trust registration, the data transmission of the user equipment, and blacklisting the user equipment of which the data transmission is terminated.

The present invention achieves the beneficial effects as below:

In the present disclosure, an access is divided into two phases for authentication by using the spatial-temporal features of the SAGIN. In the primary authentication phase, the identity identifier of the user, the facial features and the like are used as authentication factors, thus achieving the security and fastness of the access procedure. In the continued authentication phase, user traffic features and behavior features are continuously monitored to achieve more effective security services.

The features and advantages of the present disclosure will be described in detail in combination with the embodiments and accompanying drawings.

BRIEF DESCRIPTION OF FIGURES

FIG. 1 is a schematic diagram of a two-phase access authentication method integrating spatial-temporal features in the SAGIN.

FIG. 2 is a schematic diagram of a signaling flow of a two-phase access authentication method integrating spatial-temporal features in the SAGIN.

DETAILED DESCRIPTION

In order to make the objectives, technical solutions and advantages of the present disclosure clearer, the present disclosure is further described below in detail with reference to accompanying drawings and embodiments. It should be understood that the specific embodiments described here are merely to explain the present invention, and not intended to limit the scope of the present invention. In addition, in the following context, the descriptions of knowable structures and techniques are omitted to avoid unnecessary confusion with the concept of the disclosure.

The present invention claims a two-phase access authentication method integrating spatial-temporal features in the SAGIN, as shown in FIG. 1 and FIG. 2, including the following steps:

step I: an initializing phase: a ground network control center selects a parameter ω as a main key, and selects a suitable hash function $f_h(\cdot)$ simultaneously;

step II: a device registration phase: a satellite having a legal permission and a user equipment perform identity information registration, user spatial-temporal feature information acquisition and spatial-temporal feature extraction in the ground network control center respectively;

step III: a primary authentication phase: the user completes local identity authentication, and achieves bidirectional authentication between the user and the satellite under the assistance of the NCC (network control center) simultaneously to ensure the security of a communication channel;

step IV: a continued authentication phase: the satellite initiates a continued authentication request and a spatial-temporal feature data acquisition request to the user; the user sends acquired data to the satellite; and the satellite performs continued authentication on the user under the assistance of the NCC to output a final authentication decision.

Specifically, the step II is achieved by the following substeps.

(2.1) completing registration of the satellite, and performing initialization, which include the following specific steps:

(2.1.1) After receiving a registration request sent by the satellite through a secure channel, the ground network control center generates a unique identity identifier $ID_S$ for the satellite, and calculates a sharing key $K_S = f_h(ID_S \| ID_{NCC} \| \omega)$ of the satellite, where $ID_{NCC}$ represents an identity identifier of the ground network control center; in addition, the ground network control center generates a temporary identity identifier $TID_S = K_S \oplus f_h(\omega)$ for the satellite, writes data $\{ID_S, K_S, TID_S\}$ to a memory of the satellite, and stores the same locally.

(2.1.2) The satellite generates a timestamp $T_1$ and calculates $V_S = ID_S \oplus f_h(K_S \| T_1)$, and transmits $\{V_S, T_1, TID_S\}$ to the ground network control center through the secure channel.

(2.1.3) After receiving a message, the ground network control center verifies whether the timestamp meets a requirement, that is, $|T_{NCC} - T_1| \leq \Delta T$, where $T_{NCC}$ represents a timestamp when the ground network control center receives the message, and $\Delta T$ represents a threshold that the message freshness should satisfy. If the condition is not satisfied, the ground network control center denies the registration request of the satellite; if the condition is satisfied, the ground network control center respectively calculates $K_1 = TID_S \oplus f_h(\omega)$, $K_T = V_S \oplus f_h(K_1 \| T_1)$, and $K_2 = f_h(K_T \| ID_{NCC} \| \omega)$, and verifies whether $K_1$ is equal to $K_2$; if no, the ground network control center denies the access of the satellite; and if yes, the ground network control center locally stores $\{ID_S, K_S\}$, generates a timestamp $T_2$, calculates $V'_S = f_h(K_S \| T_2)$, and sends information $\{V'_S, T_2\}$ to the satellite through the secure channel.

(2.1.4) After receiving a message sent by the ground network control center, the satellite verifies whether the timestamp meets a requirement, that is, $|T_S - T_2| \leq \Delta T$; if no, the satellite denies the access; otherwise, the satellite calculates $V''_S = f_h(K_S \| T_2)$, and verifies $V'_S = V''_S$; if no, satellite denies the access, or stores information $TID'_S = f_h(ID_S \| K_S)$ and completes the flow.

(2.2) completing the user equipment registration and performing initialization, which include the following specific steps:

(2.2.1) The user equipment needs to have capabilities of acquiring biological feature and behavior feature data acquisition. First, the user selects one identity identifier $ID_{MU}$ and a high-entropy password PW, and acquires biological feature information (face information is taken as an example, and the recorded face information is denoted as $f$) through the device. The user extracts a user face key $\{\sigma, \xi\} = Gen(f)$ by use of a probabilistic key generation algorithm by a fuzzy extractor, where Gen(•) represents a fuzzy extraction function; $\sigma$ represents a facial feature key; and $\xi$ represents a public parameter corresponding to the feature key and can be used for recovery and regeneration of a key. The user selects one random number $r_1$, calculates a parameter $F = f_h(ID_{MU} \| \sigma \| r_1)$, and sends $\{ID_{MU}, F\}$ to the ground network control center through the secure channel.

(2.2.2) After receiving information sent by the user, the ground network control center searches all registered user database lists in a server of the ground network control center. If it is found that there is a user identifier $ID_{MU}$ in the database lists, the ground network control center denies the user. Otherwise, the ground network control center selects one random number $r_2$, and generates a temporary identity identifier $ID'_{MU} = f_h(ID_{MU} \| r_2)$ for the user. The ground network control center then calculates a user key $K_{MU} = f_h(ID'_{MU} \| \omega)$, calculates parameters $W_1 = K_{MU} \oplus F$ and $W_2 = f_h(ID'_{MU} \| F \| K_{MU})$ respectively, and transmits information $\{ID'_{MU}, W_1, W_2\}$ to the user through the secure channel.

(2.2.3) After receiving the information, the user calculates $ID''_{MU} = ID_{MU} \oplus ID'_{MU}$ and $RPW = f_h(ID'_{MU} \oplus PW \oplus W_2) \mod n_0$, where $n_0$ represents a parameter for preventing a speculation attack. The user calculates parameters $A = r_1 \oplus f_h(ID'_{MU} \| \sigma)$ and $W_3 = W_1 \oplus r_1$. In order to prevent user information leakage, data $\{ID''_{MU}, T_1, TID_S\}$ is locally stored on the user side, and the rest is deleted.

Specifically, the step III is achieved by the following substeps.

(3.1) When the user requests for accessing resources in a SAGIN, an identity authentication process will be performed. The user inputs identity identifier information, a password, and facial feature information to the device, locally uses a deterministic key reconstruction algorithm to calculate a biometric key, and verifies whether the identity of the user is legal; if the identity is illegal, the access is terminated; otherwise, the user equipment generates a current timestamp $T_M$, acquires a current position $L_M$ of the user, calculates an authentication message, and sends the timestamp, the current position of the user, and the authentication message to the satellite through the secure channel.

(3.2) After receiving the message of the user, the satellite first verifies whether an absolute value $|T_S - T_M|$ of a difference value between current time $T_S$ of the satellite and the timestamp $T_M$ is within a range of a threshold $\Delta T$ (low-orbiting satellite 50 ms); if no, the user access is denied; otherwise, the satellite acquires the identifier information ID in the authentication message sent by the user, and searches, according to the identifier information ID, a local database of the satellite. If a successful matching is achieved, a position $\overline{L_M}$ of the user at the end of the latest access is acquired through the identifier information ID, and it is verified whether an absolute value $|\overline{L_M} - L_M|$ of a displacement difference value is within a range of a threshold $|\overline{T_M} - T_M| \cdot \upsilon$, where $\overline{T_M}$ represents time at the end of the latest access of the user, and $\upsilon$ represents a user speed threshold (900 Km/h). If no, the user access is denied. Otherwise, a hash value of the biological feature information stored in the database of the satellite is searched according to the identifier information ID, and is then compared with a hash value sent by the user; if the two hash values are not equal, it indicates that the user is illegal, the access request of the user is denied, and authentication failure response information is returned to the user; if the two hash values are equal, a temporary session key $\omega'$ and a timestamp $T'_S$ are generated; the hash function is used to calculate a new authentication message according to the key $\omega'$; and the authentication message and the timestamp $T'_S$ are sent to the user together.

(3.3) After receiving the authentication message and the timestamp, the user first checks whether an absolute value $|T'_S - T'_M|$ of a difference value between current time $T'_M$ of the user and the timestamp $T'_S$ is within the range of the threshold $\Delta T$; if no, the access is terminated; otherwise, a sharing key between the user and the satellite is calculated, and is compared with the verification information sent by the satellite; if the sharing key does not match the verification information, the access is terminated; otherwise, the authentication in this phase is completed, and it indicates that the identity of the user is legal and an access may be allowed to a network of the satellite for data services.

Specifically, the step IV is achieved by the following substeps.

(4.1) If the user passes the primary authentication phase, and successfully accesses to the satellite for data transmission, the satellite initiates a continued authentication request and a spatial-temporal data acquisition cycle to the user; after the user receives the request, if the user agrees with the request, the user sends data to the satellite within the data acquisition cycle; and the satellite sends the data to the ground network control center. The ground network control center acquires data and trains models off line in the user registration phase. After receiving real-time data of the user, the ground NCC compares the data with features extracted from historical data, thus providing a security trust level of the user during traffic transmission, and feeding back the same to the satellite; and the satellite continues or terminates the transmission, according to security trust registration, the data transmission of the user, and blacklists the user of which the data transmission is terminated.

The above described embodiments are only the preferred embodiments of the present disclosure, and are not intended to limit the present invention. Any modifications, equivalent replacements or improvements, and the like that are made within the spirit and principle of the present invention shall fall within the protection scope of the present disclosure.

What is claimed is:

1. A two-phase access authentication method integrating spatial-temporal features in space-air-ground integrated networks, comprising the following steps:
    S1, an initializing phase: selecting, by a ground network control center, a main key parameter, and selecting a matching hash function simultaneously;
    S2, a device registration phase: performing identity information registration and spatial-temporal feature data acquisition in the ground network control center by a satellite having a legal permission and a user equipment respectively;
    S3, a primary authentication phase: completing, by a user, local identity authentication, and achieving bidirectional authentication between the user equipment and the satellite under the assistance of the ground network control center simultaneously;
    S4, a continued authentication phase: initiating, by the satellite, a continued authentication request and a spatial-temporal feature data acquisition request to the user equipment; sending, by the user equipment, acquired data to a satellite; and performing, by the satellite, continued authentication on the user equipment under the assistance of the ground network control center to output a final authentication decision.

2. The two-phase access authentication method integrating the spatial-temporal features in the satellite-to-ground communication according to claim 1, wherein the step S2 specifically comprises the following substeps:
    S21, registration of the satellite: after receiving a registration request sent by the satellite through a secure channel, selecting, by the ground network control center, an identity identifier for the satellite, calculating, on the basis of the main key parameter, a key of the satellite, and using a hash function-based security protocol to complete the registration of the satellite in the ground network control center;
    S22, registration of the user equipment: acquiring, by the user equipment, biological feature information of the user, extracting a user face key, splicing the user face key with the identity identifier and a high entropy password, and using the hash function-based security protocol to complete the registration of the user equipment in the ground network control center;
    S23, acquisition of spatial-temporal feature data: acquiring, by the user equipment, behavior feature data of the user, and transmitting the behavior feature data to the ground network control center through the secure channel; after preprocessing the behavior feature data, performing, by the ground network control center, model training to obtain model parameters; and storing the model parameters to the ground network control center.

3. The two-phase access authentication method integrating the spatial-temporal features in the space-air-ground integrated networks according to claim 2, wherein in the step S22, a probabilistic key generation algorithm is used to extract the user face key by a fuzzy extractor.

4. The two-phase access authentication method integrating the spatial-temporal features in the space-air-ground integrated networks according to claim 2, wherein in the step S23, the behavior feature data comprises a traffic type, a traffic flow, a geographical position, and a turning angle, and the preprocessing comprises clipping and rotation.

5. The two-phase access authentication method integrating the spatial-temporal features in the space-air-ground integrated networks according to claim 2, wherein the step S22 further comprises the following operations: uploading the biological feature information of a successfully registered user equipment to the satellite after the biological feature information is calculated via a hash function.

6. The two-phase access authentication method integrating the spatial-temporal features in the space-air-ground integrated networks according to claim 1, wherein the step S3 specifically comprises the following substeps:
    S31, inputting, by the user, the identity identifier, a password, and facial feature information to the user equipment; locally using a deterministic key reconstruction algorithm to calculate a biometric key, and verifying whether the identity of the user is legal; if the identity is illegal, terminating the access; if the identity is legal, generating, by the user equipment, a current timestamp, acquiring a current position of the user, calculating an authentication message, and sending the timestamp, the current position of the user, and the authentication message to the satellite through the secure channel;
    S32, receiving, by the satellite, the timestamp, the current position of the user, and the authentication message which are sent by the user equipment, and first verifying whether an absolute value of a difference value between current time of the satellite and the timestamp is within a range of a time threshold;
    if no, denying the user access; otherwise, acquiring, by the satellite, identifier information in the authentication message, and searching, according to the identifier information, a local database of the satellite;
    if a successful matching is achieved, acquiring a position and time of the user equipment at the end of the latest access through the identifier information, and verifying, in combination with the current position of the user, whether an absolute value of a displacement difference value is within a displacement threshold range;
    if no, denying the user access; otherwise, searching, according to the identifier information, a hash value of the biological feature information stored in the local database of the satellite, and comparing the hash value with a hash value sent by the user equipment; if the two hash values are not equal, indicating that the user equipment is illegal, denying an access request of the user equipment, and returning authentication failure response information to the user equipment; if the two hash values are equal, generating a temporary session key and a temporary session key timestamp, calculating the temporary session key by using the hash function to obtain a new authentication message, and sending the new authentication message and the temporary session key timestamp to the user equipment together;

S33, after receiving the new authentication message and the temporary session key timestamp, first checking, by the user equipment, whether an absolute value of a difference value between current time of the user equipment and the temporary session key timestamp is within the range of the time threshold; if no, terminating the access; otherwise, calculating a sharing key between the user equipment and the satellite, and comparing the sharing key with the new authentication message sent by the satellite; if the sharing key does not match the new authentication message, terminating the access; otherwise, completing the authentication, and indicating that the identity of the user is legal and an access may be allowed to a network of the satellite for services.

7. The two-phase access authentication method integrating the spatial-temporal features in the space-air-ground integrated networks according to claim 6, wherein the time threshold is 50 ms.

8. The two-phase access authentication method integrating the spatial-temporal features in the space-air-ground integrated networks according to claim 1, wherein the step S4 specifically comprises the following substeps:

S41, initiating, by the satellite, a continued authentication request and spatial-temporal data acquisition cycle to the user equipment;

S42 after receiving the continued authentication request, sending, by the user equipment, the spatial-temporal feature data to the satellite in the spatial-temporal data acquisition cycle, and sending, by the satellite, the spatial-temporal feature data to the ground network control center;

S43, after receiving the real-time spatial-temporal feature data of the user equipment, comparing, by the ground network control center, the real-time spatial-temporal feature data with historical spatial-temporal feature data, thus providing a security trust level of the user equipment during data transmission, and feeding back the same to the satellite; and continuing or terminating, by the satellite according to security trust registration, the data transmission of the user equipment, and blacklisting the user equipment of which the data transmission is terminated.

* * * * *